(12) United States Patent
Rehkopf et al.

(10) Patent No.: US 8,256,134 B2
(45) Date of Patent: Sep. 4, 2012

(54) DRYING APPARATUS AND METHODS FOR ETHANOL PRODUCTION

(75) Inventors: James A. Rehkopf, San Rafael, CA (US); Jeffrey L. Tate, North Port, FL (US); David A. Mirko, Payson, AZ (US)

(73) Assignee: Pulse Holdings LLC, Payson, AZ (US)

( * ) Notice: Subject to any disclaimer, the term of this patent is extended or adjusted under 35 U.S.C. 154(b) by 1029 days.

(21) Appl. No.: 12/215,214

(22) Filed: Jun. 25, 2008

(65) Prior Publication Data

US 2009/0004712 A1 Jan. 1, 2009

Related U.S. Application Data

(60) Provisional application No. 60/937,073, filed on Jun. 25, 2007.

(51) Int. Cl.
*F26B 21/00* (2006.01)
*C09K 3/00* (2006.01)
*C08J 11/04* (2006.01)
*A23K 1/06* (2006.01)
*F26B 3/02* (2006.01)
*C12P 7/06* (2006.01)

(52) U.S. Cl. ............ 34/191; 34/365; 34/478; 34/579; 252/182.11; 252/182.27; 426/7; 426/18; 426/20; 426/21; 435/18; 435/22; 435/41; 435/161; 435/254.2

(58) Field of Classification Search .......... 435/18, 435/22, 254.2, 41, 161; 426/7, 18, 20, 21, 426/28, 656; 34/191, 365, 478, 579; 252/182.11, 252/182.27
See application file for complete search history.

(56) References Cited

U.S. PATENT DOCUMENTS

| | | | |
|---|---|---|---|
| 4,667,654 A | 5/1987 | Thaler et al. |
| 5,209,821 A | 5/1993 | Shaw et al. |
| 6,763,607 B2 | 7/2004 | Beyerinck et al. |
| 6,902,715 B2 | 6/2005 | Maus et al. |
| 6,966,941 B1 | 11/2005 | Grobler et al. |
| 2004/0082044 A1 | 4/2004 | Prevost et al. |
| 2006/0194296 A1 | 8/2006 | Hammond et al. |
| 2006/0286654 A1 | 12/2006 | Kinley et al. |
| 2007/0089356 A1 | 4/2007 | Krasutsky et al. |
| 2007/0225463 A1 | 9/2007 | Femal et al. |
| 2008/0176298 A1 | 7/2008 | Randhava et al. |
| 2008/0213429 A1 | 9/2008 | Binder et al. |
| 2008/0279981 A1 | 11/2008 | Miller et al. |

FOREIGN PATENT DOCUMENTS

WO    WO 2007/012951 A1    2/2007

OTHER PUBLICATIONS

Kudra, T., et al., Chapter 14—Pulse Combustion Drying, Advanced Drying Technologies, 2002, pp. 211-237, Marcel Dekker, Inc., New York, USA.

Zbicinski, I., et al., Application of Pulse Cumbustion Technology in Spray Drying Process, Brazilian Journal of Chemical Engineering, Dec. 2000, 12 pages vol. 17, No. 4-7, (Retrieved from the Internet URL: http://scielo.br/scielo.php?script=sci_arttext&pld=S0104-66322000000400009).

Zbicinski, I., et al., Pulse Combustion: An Advanced Technology for Efficient Drying, Chemical Engineering and Technology, vol. 25, No. 7, 2002, pp. 687-691.

*Primary Examiner* — Herbert J Lilling

(74) *Attorney, Agent, or Firm* — Clise, Billion & Cyr, P.A.

(57) ABSTRACT

The apparatus and methods disclosed herein relate to the production of dried co-products from stillage produced by an ethanol production facility. In various aspects, the apparatus and methods disclosed herein relate to an ethanol production facility that produces ethanol and stillage from grain, and a pulse combustion dryer in communication with the ethanol production facility to receive stillage therefrom and adapted to dry the stillage into a dried material

15 Claims, 8 Drawing Sheets

DRYING APPARATUS AND METHODS FOR ETHANOL PRODUCTION

CROSS-REFERENCE TO RELATED APPLICATIONS

The present application claims the benefit and priority of U.S. provisional patent application No. 60/937,073 filed on Jun. 25, 2007 and entitle DRYING APPARATUS AND METHODS FOR ETHANOL PRODUCTION, the disclosure of which is hereby incorporated herein in its entirety by reference thereto.

BACKGROUND

1. Field

The present disclosure relates to apparatus and methods related to ethanol production, and, more particularly, to the apparatus and methods for the drying of stillage produced by the ethanol production process.

2. Background of the Related Art

The saccharification of polysaccharides derived from starch contained within grains such as corn, wheat, rye, sorghum, and rice has long been recognized as a potential source of mixed sugars for ethanol production by fermentation. The starch in the grain is converted to fermentable sugar which, in turn, is fermented into ethanol. The ethanol is captured from non-fermented and/or non-fermentable materials and solvent(s) such as water and the remainder sans ethanol is emitted as stillage.

The stillage may be considered a co-product of the ethanol production, and the stillage may be further fractionated into various stillage fractions. If the stillage and/or stillage fractions could be dried to form dried co-products, the dried co-products may have nutritive value and may have other utility. Accordingly, a need exists for drying technologies for use in conjunction with ethanol production to dry the stillage and/or stillage fractions into dried co-products.

SUMMARY

Apparatus and methods disclosed herein may resolve many of the needs and shortcomings discussed above and may provide additional improvements and advantages recognizable by those of ordinary skill in the art upon study of this specification.

In various aspects, the apparatus disclosed herein includes an ethanol production facility adapted to produce ethanol and stillage from grain, and a pulse combustion dryer in communication with the ethanol production facility to receive stillage therefrom and adapted to dry the stillage into a dried material.

Methods are disclosed herein. In one aspect, the methods include introducing stillage from an ethanol production facility into a pulse combustion dryer as a dryer feed material thereby obtaining a dried material therefrom. In another aspect, the methods disclosed herein include producing stillage using an ethanol production facility, extracting a stillage fraction from said stillage, and introducing the stillage fraction into a pulse combustion dryer as a dryer feed materials thereby obtaining a dried material therefrom.

In various aspects, the stillage and/or stillage fraction is generally in the form of whole stillage, wet distiller's grains, thin stillage, condensed distiller's solubles, or combinations thereof. In various aspects, the dried material is generally in the form of dried distiller's grains and solubles, dried grain fermented extractives, dried distiller's grains, dried distiller's solubles, or combinations thereof.

Other features and advantages of the apparatus and methods disclosed herein will become apparent from the following detailed description and from the claims.

Figure 1A:
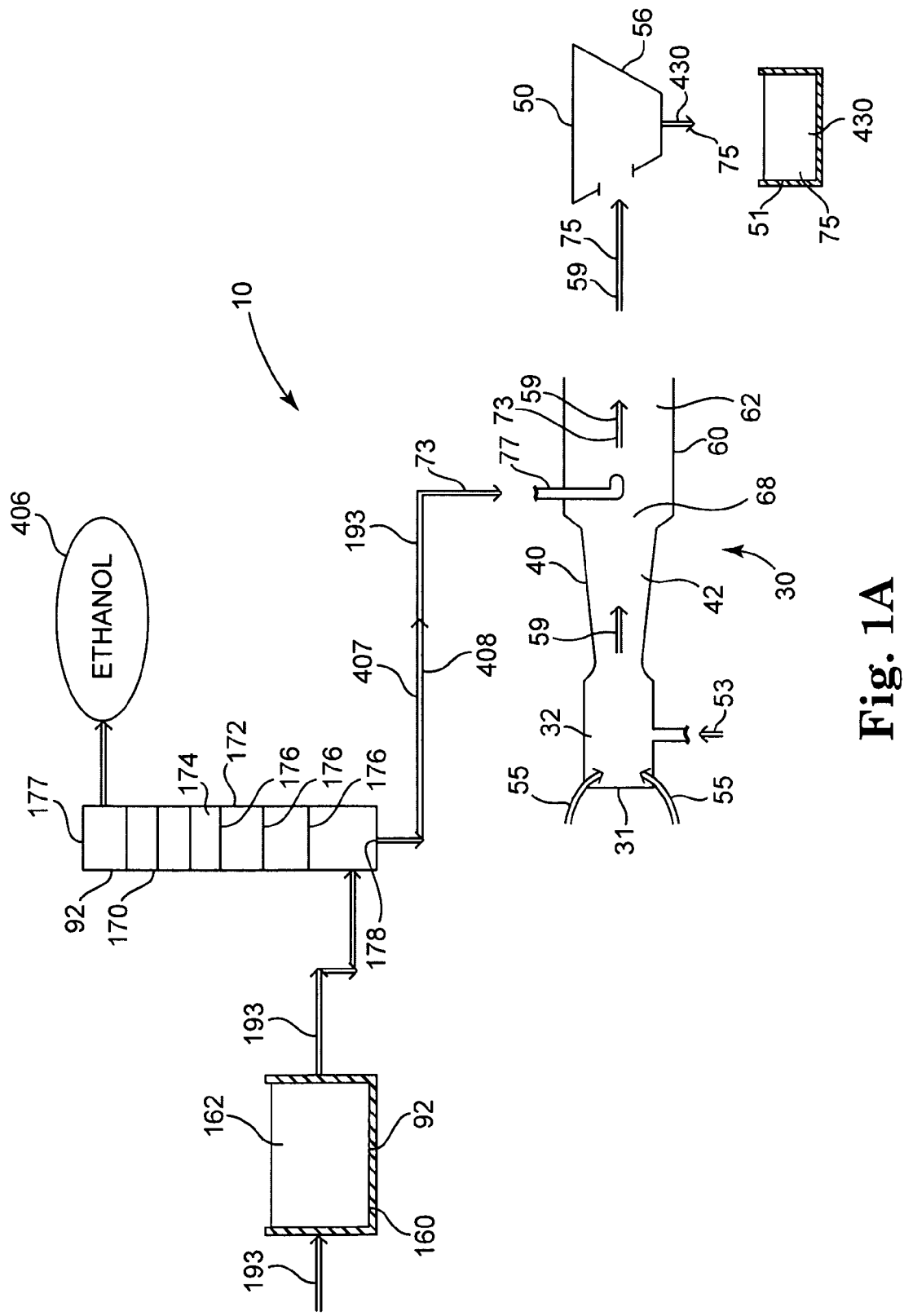
FIG. 1A illustrates by schematic diagram an exemplary embodiment of an ethanol production facility in communication with a pulse combustion dryer.

All Figures are illustrated for ease of explanation of the basic teachings only. The extensions of the Figures with respect to number, position, order, relationship and dimensions will be explained or will be within the ordinary skill of the art after the description has been studied. Furthermore, the apparatus, materials, and other parameters to conform to specific size, force, weight, strength, velocity, temperatures, flow, and similar requirements will likewise be within the ordinary skill of the art after the description has been studied. Where used in reference to the figures, the terms "top," "bottom," "right," "left," "forward," "rear," "first," "second," "inside," "outside," and similar terms should be understood to reference the apparatus and methods as described in the specification and illustrated in the drawings and are utilized for purposes of explanation only.

DETAILED DESCRIPTION

An ethanol production facility that produces ethanol and stillage from grain is disclosed herein. One or more pulse combustion dryers are in communication with the ethanol production facility to receive stillage including stillage fractions therefrom, and the one or more pulse combustion dryers are adapted to dry the stillage into a dried material. In various aspects, the stillage is introduced into pulses of heated combustion products within the pulse combustion dryer as dryer feed material to be dried into the dried material thereby. The ethanol production facility, in various aspects, is configured as a dry grind facility, as a wet mill facility, or configured in other ways to produce ethanol and stillage from grain, as would be recognized by those of ordinary skill in the art upon study of this disclosure. The resultant stillage may be fractionated in various ways into stillage fractions and the stillage, stillage fractions, and/or combinations thereof may be communicated to the pulse combustion dryer to be dried into the dried material thereby.

Methods for producing dried material from stillage are disclosed herein. The methods, in various aspects, include providing an ethanol production facility having a liquid based processing stream, the ethanol production facility producing ethanol and stillage, and providing a pulse combustion dryer. The methods may further include introducing stillage into the pulse combustion dryer as the dryer feed material and obtaining dried material from the stillage. The methods, in various aspects, may include fractionating the stillage into stillage fractions, communicating the stillage, stillage fractions, and/or combinations thereof to the pulse combustion dryer, and drying the stillage, stillage fractions, and/or combinations thereof into dried material using the pulse combustion dryer.

Glossary

The following informal definitions are offered for purposes of illustration, not limitation, in order to assist with understanding the disclosure herein.

Condensed Distillers Solubles (CDS)—the generally soluble portion of whole stillage (i.e. thin stillage) condensed by evaporation into a syrup.

Distiller's Wet Grains and Solubles (DWGS)—the generally insoluble portion of whole stillage in combination with condensed distiller's solubles in undried form.

Dried Distillers Grains (DDG)—the generally insoluble portion of whole stillage in dried form.

Dried Distiller's Grains and Solubles (DDGS)—the generally insoluble portion of whole stillage in combination with condensed distiller's solubles in generally dried form.

Dried Distiller's Solubles (DDS)—the generally soluble portion of whole stillage in dried form.

Dry Grain Fermented Extractives (DGFE)—grain fermented extractives in dried form.

Grain Fermented Extractives (GFE)—type of whole stillage produced by an ethanol production facility that uses a wet mill process for processing the grain. The wet mill process in various aspects removes the germ, fiber, and/or gluten 436 from the grain so that the grain fermented extractives is generally absent those portions of the grain.

Thin Stillage—the generally soluble portion of whole stillage.

Wet Distillers Grains (WDG)—the generally insoluble portion of whole stillage in undried form.

Whole Stillage—the remnant of the liquid based processing stream after the ethanol has been captured therefrom.

The Figures generally illustrate various exemplary implementations of the apparatus and methods of this disclosure. The particular exemplary implementations illustrated in the Figures provide for ease of explanation and understanding, even while being fully descriptive. These illustrated implementations are not meant to limit the scope of coverage, but, instead, to assist in understanding the context of the language used in this specification and in the claims. Accordingly, variations of the apparatus and methods that differ from the illustrated implementations may be encompassed by the appended claims.

The ethanol production facility includes one or more units 92 adapted to convert grain 402 into ethanol 406. The ethanol production facility 10, in various aspects, includes at least a fermenter 160 and a distillation column 170, and may include additional units 92 generally configured to cooperate with the fermenter 160 and the distillation column 170 to produce ethanol 406 from grain 402. The fermenter 160, in some aspects, defines a fermentation chamber 162 wherein yeast ferments fermentable sugars derived from grain 402 into ethanol 406. Yeast, as used herein, includes yeast as well as other biological organisms capable of fermentation, and ethanol, as used herein includes butanol, glycerol, and suchlike produced by fermentation. In other aspects, the fermenter 160 is adapted to produce ethanol by non-biological processes such as catalytic processes. A liquid based processing stream 193 containing fermentable sugars derived from grain 402 may be communicated into the fermentation chamber 162 wherein the sugars in the liquid based processing stream 193 are fermented into ethanol 406.

The fermenter 160, in various aspects, is adapted to communicate the liquid based processing stream 193 containing ethanol 406 from the fermentation chamber 162 to the distillation column 170. The distillation column 170 captures the ethanol 406 from the liquid based processing stream 193. In various aspects, the distillation column 170 may be a configured as a still, distillation column, fractionation column, absorption column, adsorption column, or suchlike adapted to capture the ethanol.

Whole stillage 408 is the remnant of the liquid based processing stream 193 after the ethanol 406 has been captured therefrom. Whole stillage 408 is an unrefined mixture that may include, for example, unfermented sugars, starches, non-starch portions of the grain, lipids, fatty acids, amino acids, proteins, and yeast wasted from the fermentation chamber 162. In various aspects, the whole stillage 408 may be composed largely of solubles, or may be composed of a combination of solubles and insolubles. Whole stillage 408 may include, in various aspects, other stream of material from other portions of the ethanol production facility 10.

The whole stillage 408 may be fractionated into stillage fractions 409, which may, in turn, be composed largely of the soluble fraction of whole stillage 408 or the insoluble fraction of whole stillage. Soluble, as used herein, includes generally dissolved materials as well as colloidal materials including lipids and proteins, very fine materials, and other not readily settleable materials, as would be recognized by those of ordinary skill in the art upon study of this disclosure. In various aspects, stillage 407 may include whole stillage 408, stillage fractions 409, and combinations thereof. The lipids, fatty acids, amino acids, and/or proteins may make whole stillage 408 and/or stillage fractions 409 difficult materials to dry.

A stillage processing unit 108 such as a centrifuge unit 205, filter unit 215, and/or flocculator 220 may be provided in various aspects to process the stillage 407 including whole stillage 408 and/or stillage fractions 409. The stillage processing unit 108 may process the whole stillage 408, for example, by extracting one or more stillage fractions 409 from the whole stillage 408.

One or more pulse combustion dryers 30 are in communication with the ethanol production facility 10, and the whole stillage 408, the stillage fraction(s) 409, or combinations thereof may be introduced into the pulse combustion dryer 30 as dryer feed material 73 Portions of the ethanol production facility 10 may communicate with the one or more pulse combustion dryers 30 to introduce the stillage 407, including whole stillage 408 and/or stillage fractions 409, into the one or more pulse combustion dryers 30 as the dryer feed material 73 to produce one or more dried co-products 430 as the dried material 75. Communication between the ethanol production facility 10 and the pulse combustion dryer 30 may be by pipe, by truck, or other manner of conveyance in various aspects.

In various aspects, the stillage fractions 409 introduced as the dryer feed material 73 into the pulse combustion dryer 30 include WDG 414, Thin Stillage 410, CDS 412, DWGS 415, other materials derived from whole stillage 408, and combinations thereof, as would be recognized by those skilled in the art upon review of this disclosure. In various aspects, the dried co-products 430 obtained as dried material 75 from the pulse combustion dryer 30 include DDG 418, DDS 420, DDGS 416, and DGFE 424. In various aspects, stillage fractions 409 may be processed by one or more stillage processing units 108 and then recombined in various ways with one another and/or with whole stillage 408 to form the dryer feed material 73.

The pulse combustion dryer 30 may include a combustor 31 that defines a combustion chamber 32, a tailpipe 40 that defines a tailpipe passage 42, the tailpipe passage 42 in fluid communication with the combustion chamber 32. Some aspects may include a drying chamber 60 that defines a drying chamber passage 62, the drying chamber passage 62 in fluid communication with the combustion chamber 32. The pulse combustion dryer 30 periodically ignites fuel 53 to provide a series of pulses of heated combustion products 59 that pass from the combustion chamber 32 through the drying passage 68. The drying passage 68 may include the tailpipe passage 42, may include the drying chamber passage 62, or may include both the tailpipe passage 42 and the drying chamber passage 62 in various aspects.

A dryer feed material 73 may be introduced into the drying passage 68 of the pulse combustion dryer 30, wherein the dryer feed material 73 may be entrained in the pulses of heated combustion products 59 to generally dry the dryer feed material 73 into dried material 75. The dried material 75 is drier than, and may be substantially drier than, the dryer feed material 73. In some aspects, substantially all of the water may be removed from the dried material 75, while in other aspects, some residual amount of water may be retained in the dried material 75. For example, the dried material 75 in various aspects contains less than 10% water by weight.

In operation, grain 402 is input into the ethanol production facility 10 as the feedstock, and is communicated among the one or more units 92 of the ethanol production facility 10 as a liquid based processing stream 193. The one or more units 92 of the ethanol production facility 10 generally convert the starch in the grain 402 into ethanol 406 and then capture the ethanol 406 from the liquid based processing stream 193. As the liquid based processing stream 193 is communicated amongst the one or more units 92 of the ethanol production facility 10, the nature of the liquid based processing stream 193 generally changes, in various aspects, from slurry to mash to fermented mash, and, finally, the liquid based processing stream 193 is separated into ethanol 406 and whole stillage 408. Stillage 407 in the form of whole stillage 408 and/or stillage fractions 409 is communicated as drier feed material to the pulse combustion dryer 30 to be dried into dried material 75.

Particular embodiments are illustrated in the following Figures. An embodiment of the ethanol production facility 10 is illustrated in FIG. 1A. As illustrated, the ethanol production facility 10 includes units 92 that form fermenter 160 and distillation column 170. The ethanol production facility 10 is in communication with pulse combustion dryer 30, as illustrated.

The fermenter 160, as illustrated in FIG. 1A, defines the fermentation chamber 162 for the fermentation of sugars derived from grain 402 in the liquid based processing stream 193 into ethanol. The fermenter 160 is configured so that the liquid based processing stream 193 containing fermentable sugars can be communicated into the fermentation chamber 162 wherein the fermentable sugars in the liquid based processing stream 193 are fermented into ethanol 406. The fermenter 160 is configured to fluidly communicate with the distillation column 170 to communicate the processing stream containing ethanol 406 from the fermentation chamber 162 to the distillation column 170.

The distillation column 170 includes a distillation column shell 172 that defines a distillation column passage 174 having a base 178 and a top 177, as illustrated in FIG. 1A. A number of porous plates 176 are interposed within the distillation column passage 174 to allow exchanges between the liquid and vapor phases within the distillation column passage 174. As illustrated, the fermenter 160 is in fluid communication with the distillation column 170 so that the liquid based processing stream 193 containing ethanol 406 may be communicated from the fermentation chamber 162 to the distillation chamber passage 174. The distillation column 170 captures the ethanol 406 generally near the top 177 of the distillation column passage 174, in various aspects, and stillage 407 in the form of whole stillage 408 is recovered generally near the base 178 of the distillation column passage 174.

As illustrated in FIG. 1A, the pulse combustion dryer 30 includes a combustor 31 that defines a combustion chamber 32, a tailpipe 40 that defines a tailpipe passage 42, and a drying chamber 60 that defines a drying chamber passage 62. As illustrated, the drying passage 68 includes the drying chamber passage 62. The pulse combustion dryer 30 also includes feed inlet 77 to allow the introduction of dryer feed material 73 into the drying passage 68. As illustrated, a pulse of air 55 and a pulse of fuel 53 may be introduced into the combustion chamber 32 and ignited to produce a pulse of heated combustion products 59. Stillage 407 in the form of whole stillage 408 may be communicated from the base 178 of the distillation column passage 174 to the feed inlet 77.

As illustrated, the pulse combustion dryer 30 is in fluid communication with the distillation column 170 to introduce the stillage 207 into the drying passage 68. The stillage is introduced through the feed inlet 77 as the dryer feed material 73 to be entrained in the pulse of combustion products 59. The pulse combustion dryer 30 uses pulses of heated combustion products 59 to dry the stillage 407, and the dried co-product 430 is expelled from the drying passage 68 within the pulses of heated combustion products 59 as the dried material 75. As illustrated, a collector 50 configured as a cyclone 56 is provided to collect the dried material 75 into bin 51. As would be recognized by those skilled in the art upon review of this disclosure, various pumps, pipes, valves, storage reservoirs, inlets, outlets, heat exchangers, process control systems, and other such apparatus and features would be provided as part of the ethanol production facility 10 to, inter alia, communicate the liquid based processing stream 193 between the fermenter 160, the distillation column 170, and the pulse combustion dryer 30 and to regulate the ethanol production facility 10.

Figure 1B:
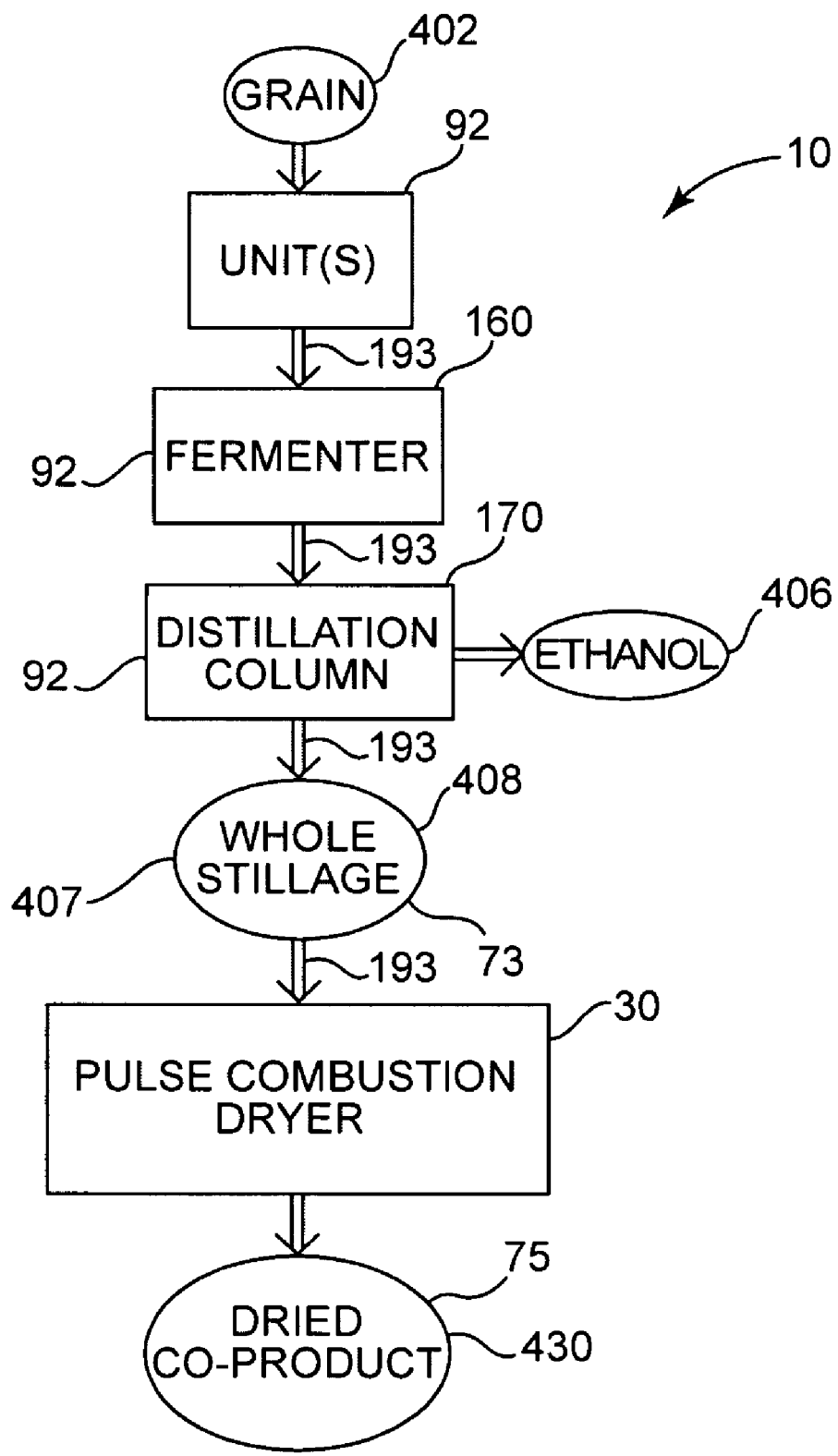
FIG. 1B illustrates by schematic diagram another exemplary embodiment of an ethanol production facility in communication with a pulse combustion dryer.

As illustrated in FIG. 1B, the ethanol production facility 10 includes the fermenter 160, distillation column 170, and includes one or more units 92 that derive fermentable sugars from the grain. The one or more units 92 are in fluid communication with the fermenter 160 to communicate the fermentable sugars into the fermentation chamber 162 of the fermenter. The fermenter 160, as illustrated, is in fluid communication with the distillation column 170 to communicate the liquid based processing stream 193 containing ethanol from the fermentation chamber 162 into the distillation column passage 174 of the distillation column 170. The distillation column 170, as illustrated, is in fluid communication with the pulse combustion dryer 30 to communicate stillage 407 including whole stillage 408 recovered from the distillation column 170 into the pulse combustion dryer 30 as the dryer feed material 73 to produce dried co-product 430 as the dried material 75.

Figure 1C:
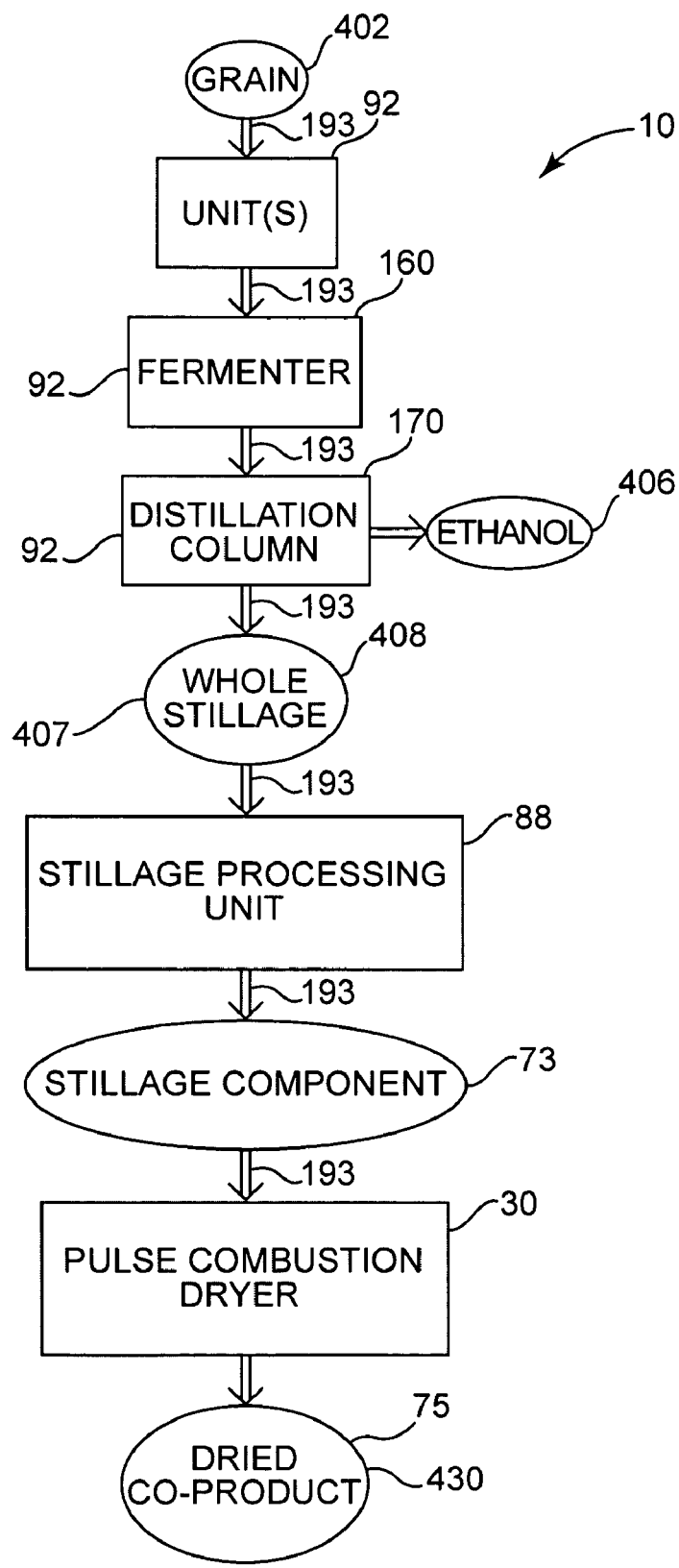
FIG. 1C illustrates by schematic diagram yet another exemplary embodiment of an ethanol production facility in communication with a pulse combustion dryer.

The embodiment illustrated in FIG. 1C includes stillage processing unit 88 to extract the stillage fraction 409 from the whole stillage 408. The stillage processing unit 88 is in fluid communication with the distillation column 170 to receive whole stillage 408 recovered from the distillation column 170. The stillage processing unit 88 is in fluid communication with the pulse combustion dryer 30 to introduce the stillage fraction 409 into the pulse combustion dryer 30 as dryer feed material 73 in order to produce dried co-product 430 as the dried material 75 therefrom. In various embodiments, one or more stillage processing units 88 may be included in the ethanol production facility 10 to extract a plurality of stillage fractions 409 from the whole stillage 408. The one or more stillage processing units 88 may be configured to communicate whole stillage 408 and/or stillage fractions 409 including combinations thereof either simultaneously or sequentially to one or more pulse combustion dryers 30 as the dryer feed material 73 to produce one or more dried co-products 430 as the dried material 75. In various embodiments, one or more stillage processing units 88 may process the stillage fraction 409 to further modify the stillage fraction 409 and/or to extract additional stillage fractions 409 from the stillage fraction 409.

Figure 2A:
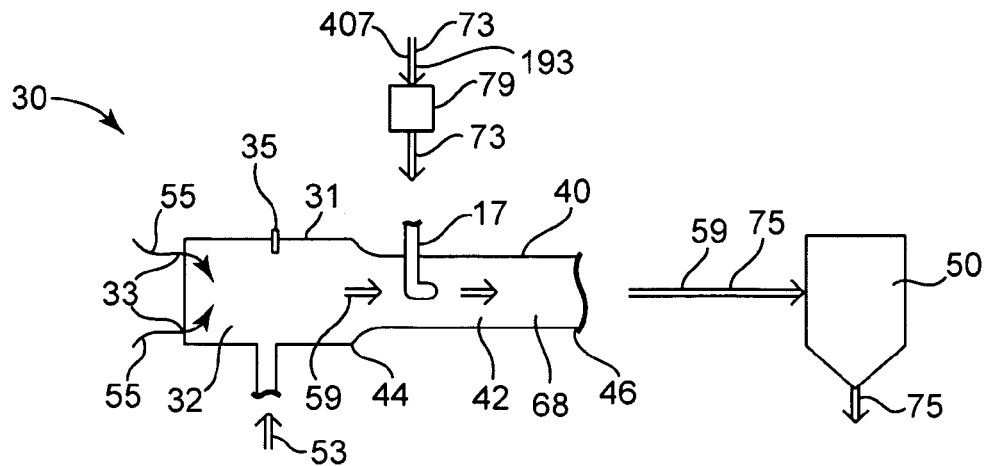
FIG. 2A illustrates by schematic diagram an exemplary embodiment of a pulse combustion dryer.
Figure 2B:
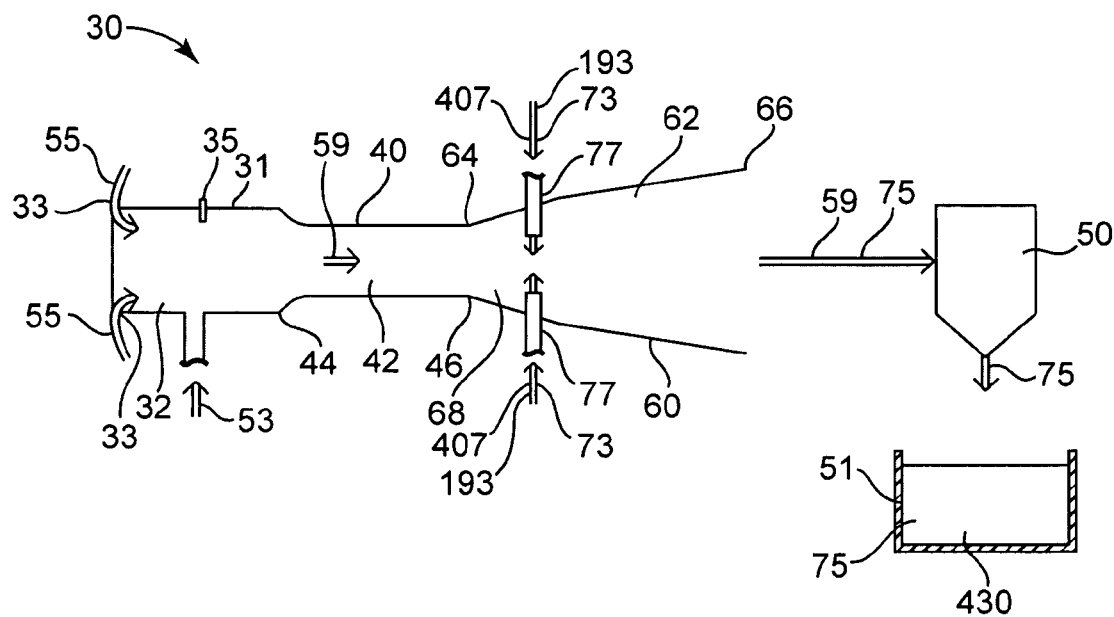
FIG. 2B illustrates by schematic diagram another exemplary embodiment of a pulse combustion dryer.

FIGS. 2A and 2B generally illustrate embodiments of the pulse combustion dryer 30. The pulse combustion dryer 30, as illustrated, includes a combustor 31 that defines a combustion chamber 32 and a tailpipe 40 that defines a tailpipe passage 42 with a first end 44 and a second end 46. The first end 44 of the tailpipe 40 is connected to the combustion chamber 32 so that the tailpipe passage 42 is in fluid communication with the combustion chamber 32. The second end 46 of the tailpipe 40 may be connected to a collector 50 so that the tailpipe passage 42 is in fluid communication with the collector 50, as illustrated in FIG. 2A. The combustion chamber 32 is configured to receive a pulse of fuel 53 and a pulse of air 55 and to ignite the fuel-air mixture to produce a pulse of heated combustion products 59. The combustion chamber 32 fluidly communicates with the tailpipe passage 42 to expel the heated combustion products 59 through the tailpipe passage 42 from the first end 44 to the second end 46.

The pulse combustion dryer 30 may be generally configured as a resonator such as a Helmholtz resonator to ignite the fuel-air mixture periodically, in contrast to the continuous ignition in conventional dryers. The combustion chamber 32 ignites the fuel-air mixture to produce a compression wave that propagates through the tailpipe passage 42 from the first end 44 to the second end 46. The compression wave may be followed by a rarefaction wave that propagates through the tailpipe passage 42 from the second end 46 to the first end 44 to draw air 55 and combustion products 59 generally through the passage from the second end 46 to the first end 44 and into the combustion chamber 32. The rarefaction wave may replenish the air 55 in the combustion chamber 32 and may also provide an ignition source for subsequent ignitions. Thus, the length of the tailpipe 40 may be sized to control the period between ignitions by controlling the period of the compression wave and rarefaction wave.

As illustrated in FIGS. 2A and 2B, the combustion chamber 32 may also receive air 55 through one or more combustion chamber inlets 33. The combustion chamber 32 may receive fuel 53 which may be introduced generally in sequence with the rarefaction waves to be ignited by the combustion products 59 carried back into the combustion chamber 32 by the rarefaction wave. The fuel 53 may be solid, liquid, or gaseous or combinations thereof. One or more igniters 35 may also be generally disposed about the combustion chamber 32 to ignite the fuel-air mixture.

The pulse combustion dryer 30 may be configured so that the dryer feed material 73 may be introduced generally into the tailpipe passage 42 as illustrated in FIG. 2A, to be entrained in the pulse of combustion products 59 and dried while being propelled through the tailpipe passage 42 to the second end 46. In this embodiment, the drying passage 68 includes the tailpipe passage 42. The collector 50 may be in fluid communication with the second end 46 to allow the collector 50 to collect the dried material 65 from pulses of heated combustion products 59. The pulse combustion dryer 30 uses the heat of the combustion products 59 to generally dry the dryer feed material 73 into the dried material 75 as the dryer feed material 73 is propelled through the drying passage 68.

In some embodiments, a drying chamber 60 that defines a drying chamber passage 62 with a first drying chamber end 64 and a second drying chamber end 66 is included in the pulse combustion dryer 30, as illustrated in FIG. 2B. The first drying chamber end 64 is generally connected to the second end 46 of the tailpipe 40 so that the drying chamber passage 62 is in fluid communication with the tailpipe passage 42, as illustrated, to allow pulses of combustion products 59 to pass through the tailpipe passage 42 from the first end 44 to the second end 46, and to pass through the drying chamber passage 62 from the first drying chamber end 64 to the second drying chamber end 66. The pulse combustion dryer 30 is configured in this illustrated embodiment such that the dryer feed material 73 is introduced into the drying chamber passage 62 generally proximate the first end 44, entrained in the pulse of combustion products 59, and propelled through the drying chamber passage 62 to the second drying chamber end 66. Thus, in this embodiment, the drying passage 68 includes the drying chamber passage 62. The second drying chamber end 66 communicates with the collector 50 to allow the collector to collect the dried material 75. The pulse combustion dryer 30 uses the heat of the combustion products 59 to generally dry the dryer feed material 73 into the dried material 75 as the dryer feed material 73 is propelled through the drying passage 68.

The output power for certain embodiments of the pulse combustion dryer 30 ranges from about 70 to about 1000 kW. Pulse combustion dryers 30 operate at frequencies ranging from about 20 to 250 Hz in various implementations. In implementations having a drying chamber 60, the harmonic frequency of the drying chamber 60 may be matched to the frequency of the tailpipe 40 so that the tailpipe 40 excites the drying chamber passage 62. Pressure oscillation in the combustion chamber 32 of ±10 kPa may produce velocity oscillation in the tailpipe 40 of about ±100 m/s, in various implementations, so the instantaneous velocity of the gas jet at the second end 46 of the tailpipe 40 may vary from about 0 to 100 m/s.

One or more feed inlets 77 may be included in the pulse combustion dryer 30 to introduce the dryer feed material 73 into the drying passage 68 of the pulse combustion dryer 30. In some embodiments, the feed inlet 77 is generally configured as a pipe. The dryer feed material 73 may be generally in a liquid form, or may be in the form of slurry, paste, or other viscous or non-Newtonian form. The dryer feed material 73 may include various agglomerations, aggregations, non-homogeneities and/or chunks of solids, and suchlike would be typical of whole stillage 408 and the various stillage fractions 409. The size of the solids including the various agglomerations, aggregations, non-homogeneities and/or chunks in the dryer feed material 73 may be limited generally by the size of the passage defined by the feed inlet 77. As illustrated in FIG. 2A, a slurry pump 79, which may be a screw pump, positive displacement pump, or other pump capable of pumping slurry, paste, or similar viscous and/or non-Newtonian dryer feed material(s) 73, may be used to introduce the dryer feed material 73 through the feed inlet 77. In various embodiments, the feed inlet 77 may include a nozzle, sprayer, or similar feature to atomize the dryer feed material 73 as the dryer feed material 73 is introduced into the tailpipe passage 42 or into the drying chamber passage 62 of the pulse combustion dryer 30. However, inclusion of the nozzle, sprayer, or similar feature to atomize the dryer feed material 73 may not be necessary in various embodiments wherein the dryer feed material 73 is whole stillage 408 and/or stillage fraction(s) 409 as the combination of oscillatory flow, shock waves, and turbulence in the pulses of combustion products 59 within the drying passage 68 may tend to shear the dryer feed material 73 to produce dried material 75 having a uniform size distribution.

The collector 50 is configured to receive the product stream exiting the tailpipe 40 or exiting the drying chamber passage 62, which contains evaporated liquids, dried material 75 and the combustion products 59, in order to capture the dried material 75, as illustrated in FIGS. 2A and 2B. The collector 50 can include a cyclone, a baghouse, other filters, or a series of such apparatus. In the embodiments illustrated in FIGS. 2A and 2B, the collector 50 includes a baghouse 52 to collect the dried material 75 into a bin 51.

Figure 3:
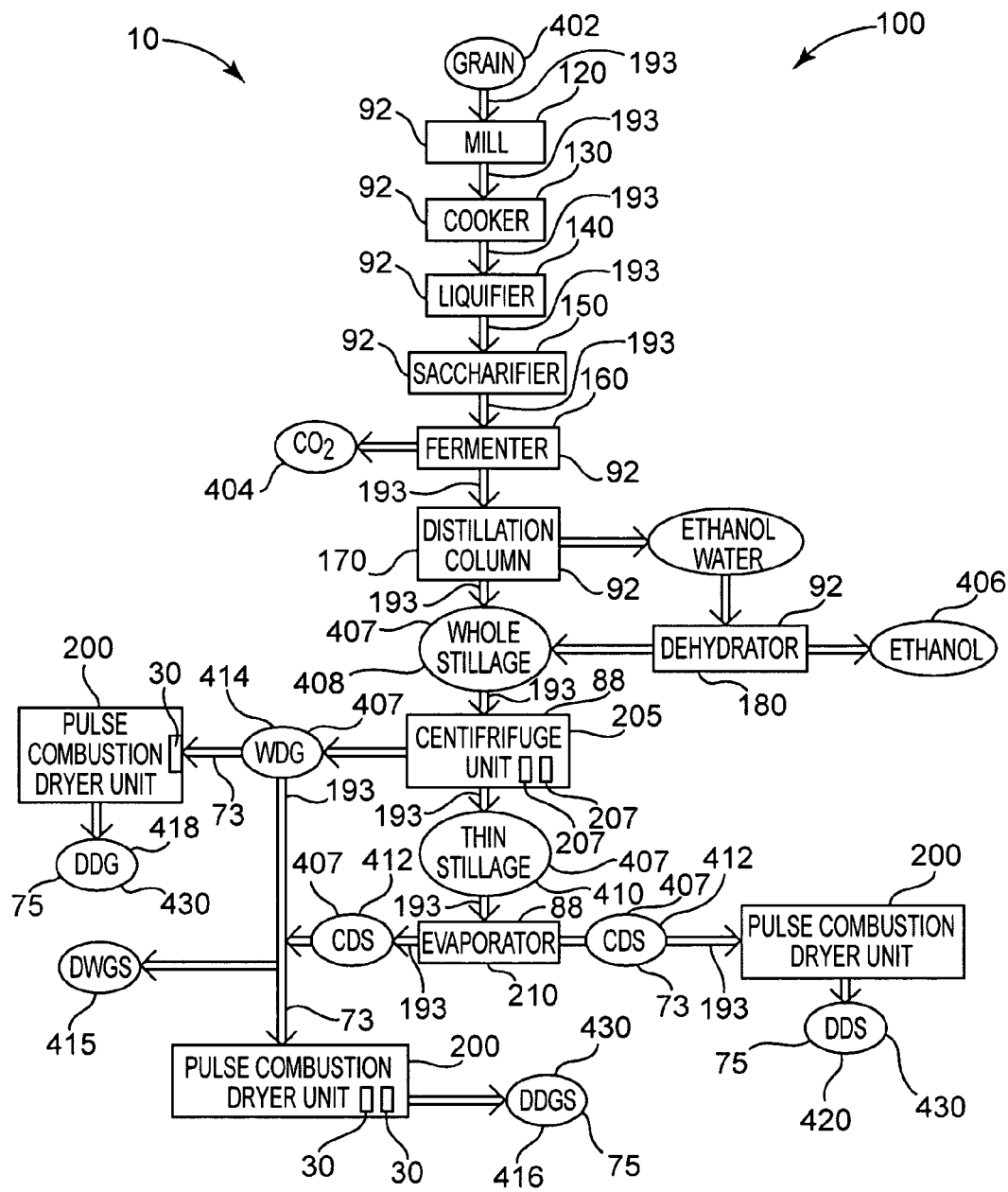
FIG. 3 illustrates by schematic diagram an exemplary embodiment of an ethanol production facility formed as a dry grind facility in communication with a pulse combustion dryer.

An implementation of an ethanol production facility 10 configured as the dry grind facility 100 is illustrated in FIG. 3. As illustrated, the units 92 to the ethanol production facility 10 include a mill 120, a cooker 130, a liquefier 140, a saccharifier 150, a fermenter 160, a distillation column 170, and a dehydrator 180. The mill 120 is generally configured to accept grain 402 as feedstock and to mill the grain 402 to generally reduce the grain 402 into a meal and/or powder. The mill 120 may include a hammer-mill, various grinder(s) and/or other milling machines. The mill 120, as illustrated, is configured to mix the meal and/or powder with water to form slurry, and is in fluid communication with the cooker 130 to communicate the slurry to the cooker 130 as the liquid based processing stream 193.

The cooker 130, the liquefier 140, the saccharifier 150, the fermenter 160, the distillation column 170, and the dehydrator 180 are in fluid communication to communicate the liquid based processing stream 193 from the cooker 130 to the liquefier 140, and, thence, to the saccharifier 150, the fermenter 160, the distillation column 170, and the dehydrator 180, as illustrated. The nature of the liquid based processing stream 193 generally changes from slurry to mash to fermented mash, and finally, to ethanol 406 and whole stillage 408 as the liquid based processing stream 193 is communicated through the units 92 of the dry grind facility 100.

The cooker 130 heats the slurry along with enzymes such as alpha-amylase in order to solubilize the starch to produce a mash. This may be referred to as gelatinization. Gelatinization allows enzymes to access the starch molecules to cleave the polymeric bonds and release the simple sugars for fermentation. In various embodiments, the cooker 130 may be configured as a jet cooker. The jet cooker, in various implementations, heats the slurry to temperatures in excess of 100° C. and at pressures of several atmospheres to gelatinize the starch. Water molecules may be adsorbed or absorbed by the starch causing the starch molecules to expand thereby weakening the structure of the starch and releasing the starch molecules. The enzymes may also act in various ways to disrupt the structure of the starch. This, in turn, may allow water to access additional starch molecules to further degrade the structure of the starch.

The cooker 130 may communicate the mash to the liquefier 140, as illustrated. In the liquefier 140, the temperature of the mash is from about 90° C. to about 95° C. in various implementations. The liquefier 140 may add additional enzymes such as alpha-amylase may to the mash to cleave the long polysaccharide chains of the gelatinized starch molecules into shorter chains such as maltodextrins and oligosaccharides. This cleaving of these long polysaccharide chains tends to reduce the viscosity of the mash, hence the term liquefier. In other implementations, the cooker 130 and the liquefier 140 may be combined to both solubilize the starch and cleave the polysaccharide chains of the starch molecules.

As illustrated in FIG. 3, the liquefier 140 may communicate the mash to the saccharifier 150. The saccharifier 150 adds more enzymes to the mash to convert the smaller sugar chains into fermentable sugars such as glucose, which could then be fermented into ethanol 406 by the yeast in the fermenter 160. The saccharifier 150 may add enzymes such as gluco-amylase to hydrolyze maltodextrins and oligosaccharides into single glucose sugar molecules.

In the illustrated embodiment, the saccharifier 150 may communicate the mash as the liquid based processing stream 193 to the fermentation chamber 162 of the fermenter 160. The fermenter 160 combines the mash with yeast, for example *Saccharomyces cerevisae*, in the fermentation chamber 162 to metabolize the fermentable sugars in the mash into ethanol 406. In other embodiments, the saccharifier 150 may be combined with the fermenter 160 to reduce starch into fermentable sugars and to ferment the fermentable sugars. Those of ordinary skill in the art would recognize other such combinations of units 92 upon review of this disclosure.

In the embodiment illustrated by FIG. 3, the fermenter communicates the fermented mash as the liquid based processing stream 193 to the distillation column 170 to capture the ethanol 406 produced during fermentation by distillation. The distillation column 170 communicates the ethanol 406, which contains some water, to the dehydrator 180 in this implementation. The dehydrator 180 is configured to strip the water from the ethanol 406 to produce essentially anhydrous ethanol 406. The dehydrator 180 may include a dehydration column and/or other water removing units to strip residual water from the ethanol 406.

In this implementation, the distillation column 170 and the dehydrator 180 produce stillage 407 in the form of whole stillage 408. The whole stillage 408, as illustrated, is the residual non-ethanol fraction of the liquid based processing stream 193 that remains after the distillation column 170 captures the ethanol 406 from the liquid based processing stream 193, and the dehydrator 180 strips the residual water from the ethanol 406.

As illustrated in FIG. 3, the ethanol production facility 10 includes one or more pulse combustion dryer units 200 to produce generally dried co-products from whole stillage 408 including various fractions of whole stillage 408. Each pulse combustion dryer unit 200 includes at least one pulse combustion dryer 30 to produce dried material 75 from the dryer feed material 73 communicated to the pulse combustion dryer unit 200.

The ethanol production facility 10 may include one or more stillage processing units 88 that cooperate with the pulse combustion dryer unit 200 to produce generally dried co-products from whole stillage 408, stillage fractions 409, and/or combinations thereof. For example, as illustrated in FIG. 3, the ethanol production facility 10 may include a centrifuge unit 205 that includes one or more centrifuges 207 and an evaporator 210 configured to evaporate liquid. The centrifuge unit 205, as illustrated, is configured to receive the whole stillage 408 from the distillation column 170 and from the dehydrator 180, and to separate the insoluble solids from the soluble materials in the whole stillage 408 by centrifugation. The insoluble solids are the WDG 414. The supernatant from the centrifuge unit 205 contains the soluble materials and is termed Thin Stillage 410. In other embodiments, the stillage processing unit 88 could be configured as a filter unit 215 that includes one or more filters such as vacuum filters to separate the whole stillage 408 into Thin Stillage 410 and WDG 414.

As illustrated in FIG. 3, the centrifuge unit 205 is in fluid communication with the evaporator to communicate the Thin Stillage 410 to the evaporator 210. The evaporator 210 is heats the Thin Stillage 410 to remove moisture from the Thin Stillage 410 by evaporation and form a syrup, which generally contains the soluble materials in the whole stillage 408. The syrup produced by the evaporator 210 from the Thin Stillage 410 is CDS 412.

As illustrated in FIG. 3, the centrifuge unit 205 communicates the WDG 414 to the pulse combustion dryer unit 200. The pulse combustion dryer unit 200 introduces the WDG 414 into the one or more pulse combustion dryers 30 included therein as the dryer feed material 73 to produce DDG 418 in this implementation.

The centrifuge unit 205 may be configured to communicate the WDG 414 to the pulse combustion dryer unit 200 and the evaporator 210 may be configured to communicate the CDS 412 to the pulse combustion dryer unit 200. The pulse combustion dryer unit 200 may be configured to receive the CDS 412 and the WDG 414, combine the CDS 412 and the WDG 414 in various proportions to form DWGS, and to introduce the DWGS into the one or more pulse combustion dryers 30 as the dryer feed material 73 to produce DDGS 416 as the dried material 75.

As illustrated in FIG. 3, the pulse combustion dryer unit 200 receives the CDS 412 from the evaporator 210 and to introduce the CDS 412 into the pulse combustion dryer unit 200 as the dryer feed material 73 and DDS 420 is produced therefrom as the dried material 75.

Figure 4A:
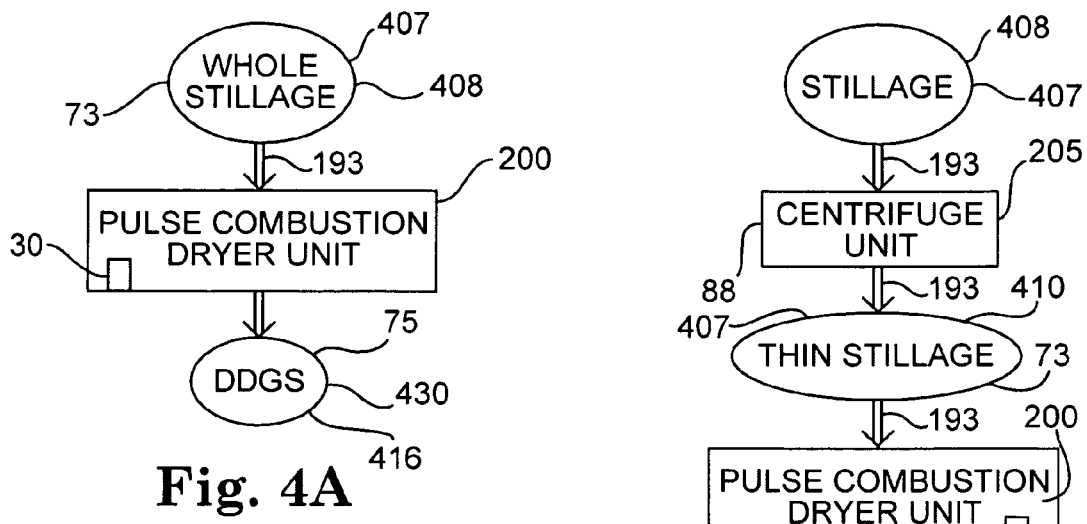
FIG. 4A illustrates by schematic diagram an exemplary embodiment of material flow about the pulse combustion dryer.
Figure 4B:
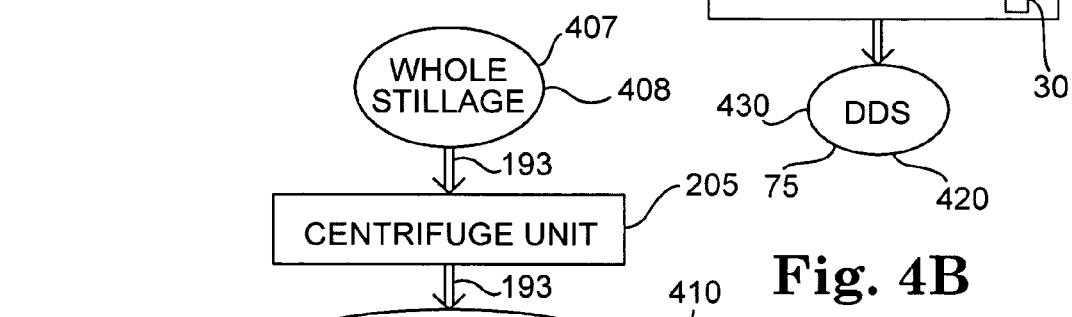
FIG. 4B illustrates by schematic diagram another exemplary embodiment of material flow about the pulse combustion dryer.
Figure 4C:
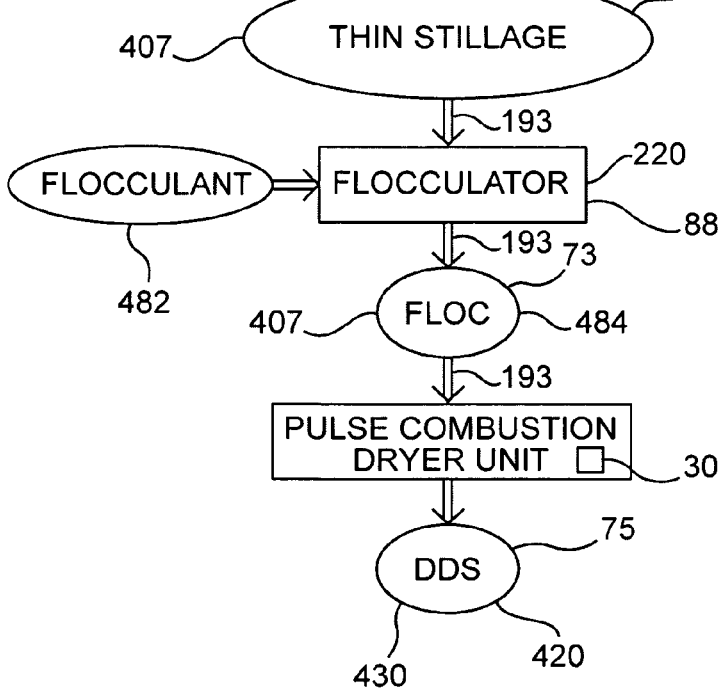
FIG. 4C illustrates by schematic diagram yet another exemplary embodiment of material flow about the pulse combustion dryer.

FIGS. 4A, 4B, and 4C illustrates alternative embodiments that process the whole stillage 408 or the Thin Stillage 410 from the dry grind facility 100. As illustrated in FIG. 4A, the pulse combustion dryer unit 200 receives whole stillage 408 and the whole stillage 408 is introduced into the one or more pulse combustion dryers 30 within the pulse combustion dryer unit 200 as the dryer feed material 73 to produce DDGS 416 as the dried material 75. The stillage processing unit 88 such as the centrifuge unit 205 and the evaporator 210 are eliminated in this implementation.

The embodiment of FIG. 4B includes centrifuge unit 205 and pulse combustion dryer unit 200. Whole stillage 408 is communicated to the centrifuge unit 205, and the centrifuge unit communicates the Thin Stillage 410 to the pulse combustion dryer unit 200, in this embodiment, and the Thin Stillage 410 is introduced into the one or more pulse combustion dryers 30 within the pulse combustion dryer unit 200 as the dryer feed material 73 to produce DDS 420 as the dried material 75. Production of CDS by evaporation is eliminated in this implementation.

Centrifuge unit 205 and flocculator 220 are included in the implementation illustrated in FIG. 4C. The centrifuge unit 205, as illustrated, communicates the Thin Stillage 410 to the flocculator 220. a flocculant 482 is added to the Thin Stillage 410 within the flocculator 220 to precipitate the dissolved materials out of the thin stillage 410 as a floc 484. The flocculant 482 may be isinglass, Irish moss, alum, or other flocculants or combinations of flocculants that would be recognized by those skilled in the art upon review of this disclosure. The flocculator 220 in this implementation communicates the floc 484 to the pulse combustion dryer unit 200, and the floc 484 is introduced into the one or more pulse combustion dryers 30 within the pulse combustion dryer unit 200 as the dryer feed material 73 to produce DDS 420 as the dried material 75.

In various embodiments, the pulse combustion dryer unit 200 could be configured to combine the floc 484 with the WDG 414 and introduce the combined floc-WDG into the pulse combustion drier 30 as the dryer feed material 73 to produce a type of DDGS 416 as the dried material 75. In still other embodiments, the whole stillage 408 is communicated to the flocculator 220, and the flocculator 220 communicates the resulting floc 484 to the pulse combustion dryer unit 200. The floc 484 is introduced into the one or more pulse combustion dryers 30 within the pulse combustion dryer unit 200 as the dryer feed material 73 to produce DDGS 416 as the dried material 75.

Figure 5:
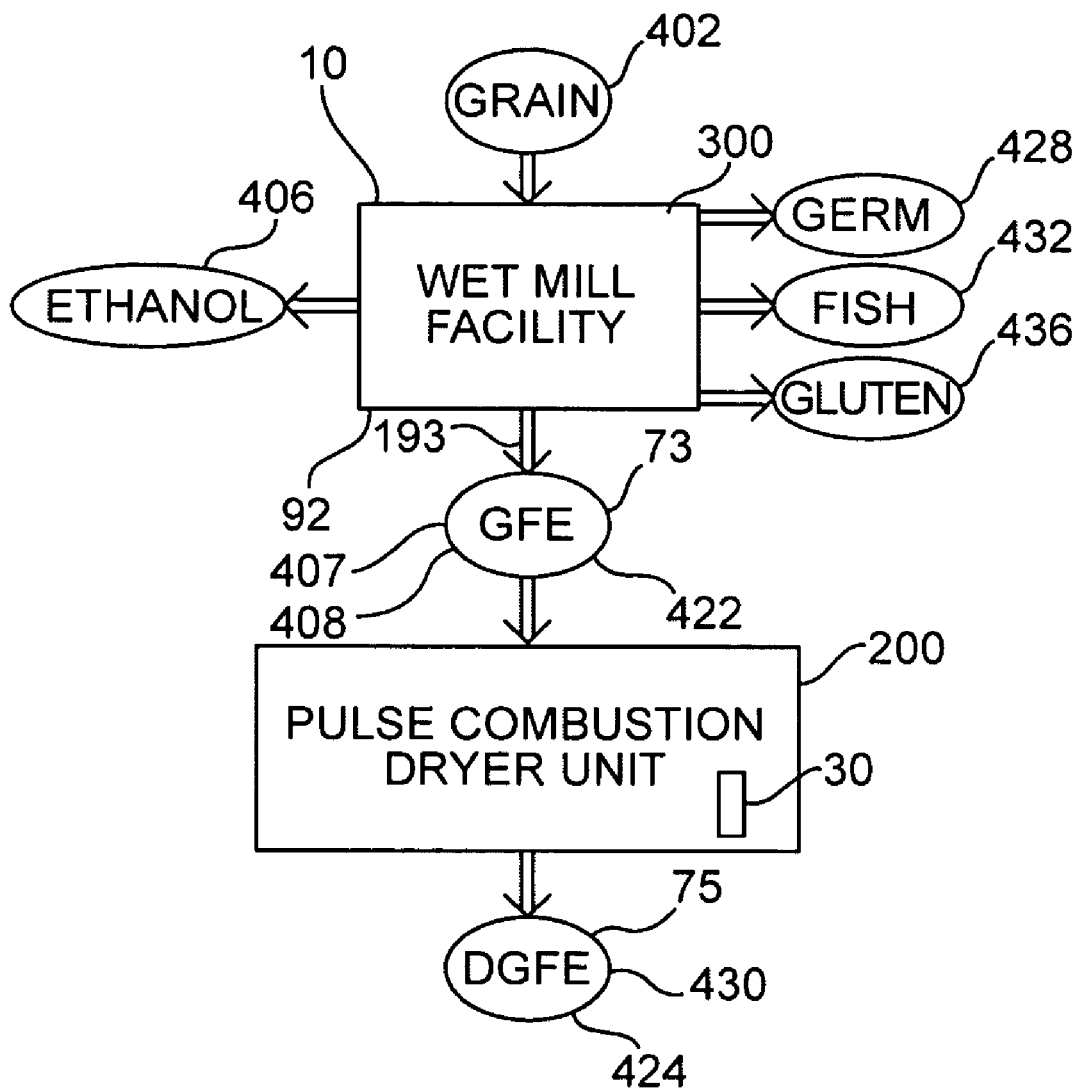
FIG. 5 illustrates by schematic diagram an exemplary embodiment of an ethanol production facility formed as a wet mill facility in communication with a pulse combustion dryer; and, FIG. 6 illustrates by flow chart an exemplary embodiment of a method for drying stillage.

An embodiment of an ethanol production facility 10 configured as the wet mill facility 300 is illustrated in FIG. 5. The wet mill facility 300, as illustrated, includes one or more units 92. The wet mill facility 300, as illustrated, accepts grain 402 as feedstock, extracts germ 428, fiber 432, and gluten 436 from the grain 402, and ferments sugars derived from starches in the grain 402 to produce ethanol 406. The wet mill facility 300 captures the ethanol 408 and produces a type of whole stillage 408 termed GFE 422 as the remainder in this implementation. In this implementation, the GFE 422 generally contains soluble non-fermented materials in the grain 402 feedstock minus the germ 428, fiber 432, and gluten 436. The GFE 422 further contains yeast wasted from the wet mill facility 300 in this implementation.

As illustrated in FIG. 5, the wet mill facility 300 communicates the GFE 422 to the pulse combustion dryer unit 200. The pulse combustion dryer unit 200 introduces GFE 422 into the one or more pulse combustion dryers 30 included therein as the dryer feed material 73 to produce DGFE 424 as the dried material 75.

Various other implementations could include one or more stillage processing units 88 configured to concentrate, separate, or otherwise process the GFE 422 prior to introduction of the GFE 422 into the pulse combustion dryers 30 as dryer feed material 73. For example, an evaporator 210 could be used to concentrate the GFE 422 and the concentrated GFE 422 from the evaporator 210 introduced into the pulse combustion dryers 30 as dryer feed material 73 to produce DGFE as the dried material 75. As would be recognized by those skilled in the art upon review of this disclosure, other stillage processing units 88 that cooperate with the pulse combustion dryer unit 200 to produce DGFE 424 and other dried co-products 430 from GFE could be included in various other embodiments of the ethanol production facility 10.

Methods for the production of one or more dried co-products 430 from stillage 407 derived from the production of ethanol 406 are disclosed herein. The methods, in various aspects, may include providing an ethanol production facility 10 having a liquid based processing stream 193, providing at least one pulse combustion dryer 30, producing stillage 407 by the ethanol production facility, and introducing the stillage 407 into the pulse of heated combustion products 59 in the drying passage 68 of the pulse combustion dryer 30 as the dryer feed material 73 to produce co-product 430 as the dried material 75. In various aspects, the methods include capturing ethanol 406 from the liquid based processing stream 193 and obtaining stillage 407 from at least portions of the remainder of the liquid based processing stream 193. The methods may include extracting one or more stillage fractions 409 from whole stillage 408. The methods, in various aspects, may include providing one or more stillage processing units 88 and may include processing the whole stillage 408 and/or stillage fractions 409 including extracting one or more stillage fractions 409 from the whole stillage 408, separating, dewatering, and/or otherwise processing the whole stillage 408 and/or stillage fractions 409 using the one or more stillage processing units 88. The methods may also include introducing the whole stillage 408, the stillage fractions 409, and/or combinations thereof into the one or more pulse combustion dryers 30 as the dryer feed material 73 thereby obtaining one or more dried co-products 430 as the dried material 75.

In various aspects, the methods include introducing stillage from an ethanol production facility into a pulse combustion dryer as a dryer feed material thereby obtaining a dried material therefrom. In various aspects, the stillage includes whole stillage and the dried material obtained therefrom includes dried distiller's grains and solubles. In various aspects, the stillage includes whole stillage in the form of grain fermented extractives and the dried material obtained therefrom includes dried grain fermented extractives. In various aspects, the stillage includes wet distiller's grains and the dried material obtained therefrom includes dried distiller's grains. In various aspects, the stillage includes thin stillage and the dried material obtained therefrom includes dried distiller's solubles.

In various aspects, the methods include producing stillage using an ethanol production facility, extracting a stillage fraction from said stillage, and introducing the stillage fraction into a pulse combustion dryer as a dryer feed materials thereby obtaining a dried material therefrom. In various aspects, the stillage fraction includes wet distiller's grains and the dried material obtained therefrom includes dried distiller's grains. In various aspects, the stillage fraction includes thin stillage and the dried material obtained therefrom includes dried distiller's solubles. In various aspects, the stillage fraction includes condensed distiller's solubles obtained therefrom and the dried material includes dried distiller's solubles.

Figure 6:
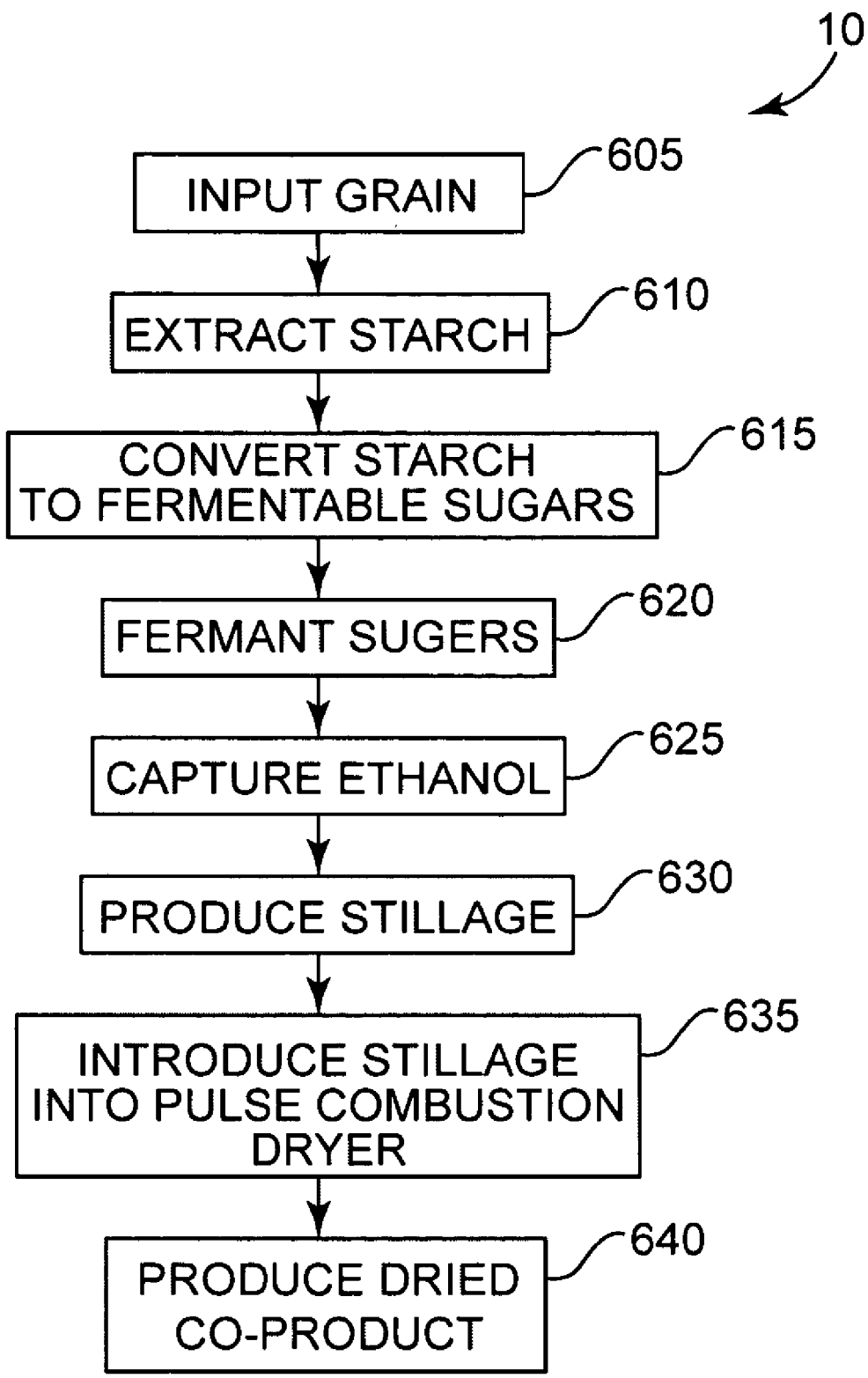

An embodiment of the methods is presented in the flowchart illustrated in FIG. 6. This illustrated embodiment of the methods begins with the step 605 of inputting grain into the ethanol production facility 10. The method proceeds with the steps 610, 615 of extracting the starch from the grain, and converting the starch to simple sugars, respectively. These are followed by the step 620 fermenting sugars to produce ethanol and step 625 capturing the ethanol thereby producing stillage in step 630. The method, as illustrated, concludes with the step 635 of introducing the stillage into the pulse combustion dryer and step 640 of producing dried co-product. In various aspects, the dried co-product 430 may be DDS, DDGS, or DGFE.

The foregoing discussion discloses and describes merely exemplary implementations. Upon study of this specification, one of ordinary skill in the art will readily recognize from such discussion, and from the accompanying figures and claims, that various changes, modifications and variations can be made therein without departing from the spirit and scope of the following claims.

What is claimed is:

1. A method, comprising:
   introducing stillage from an ethanol production facility into a pulse combustion dryer as a dryer feed material thereby obtaining a dried material therefrom.

2. The method, as in claim 1, wherein the stillage comprises whole stillage and the dried material obtained therefrom comprises dried distiller's grains and solubles.

3. The method, as in claim 1, wherein the stillage consists essentially of whole stillage and the dried material obtained therefrom consists essentially of dried distiller's grains and solubles.

4. The method, as in claim 1, wherein the stillage comprises whole stillage and the dried material comprises dried grain fermented extractives.

5. The method, as in claim 1, wherein the stillage consists essentially of whole stillage and the dried material consists essentially of dried grain fermented extractives.

6. The method, as in claim 1, wherein the stillage comprises wet distiller's grains and the dried material comprises dried distiller's grains.

7. The method, as in claim 1, wherein the stillage comprises thin stillage and the dried material comprises dried distiller's solubles.

8. The method, as in claim 1, wherein the stillage comprises condensed distiller's solubles and the dried material comprises dried distiller's solubles.

9. A method, comprising:
   producing stillage using an ethanol production facility;
   extracting a stillage fraction from said stillage; and
   introducing the stillage fraction into a pulse combustion dryer as a dryer feed materials thereby obtaining a dried material therefrom.

10. The method, as in claim 9, wherein the stillage fraction comprises wet distiller's grains and the dried material obtained therefrom comprises dried distiller's grains.

11. The method, as in claim 9, wherein the stillage fraction comprises thin stillage and the dried material obtained therefrom comprises dried distiller's solubles.

12. The method, as in claim 9, wherein the stillage fraction comprises condensed distiller's solubles and the dried material obtained therefrom comprises dried distiller's solubles.

13. The method, as in claim 9, wherein the stillage fraction consists essentially of wet distiller's grains and the dried material obtained therefrom consists essentially of dried distiller's grains.

14. The method, as in claim 9, wherein the stillage fraction consists essentially of thin stillage and the dried material obtained therefrom consists essentially of dried distiller's solubles.

15. The method, as in claim 9, wherein the stillage fraction consists essentially of condensed distiller's solubles and the dried material obtained therefrom consists essentially of dried distiller's solubles.

* * * * *